June 28, 1966 R. W. FRICKE 3,257,729
UNIVERSAL GAUGE DEVICE
Filed June 14, 1963 2 Sheets-Sheet 2
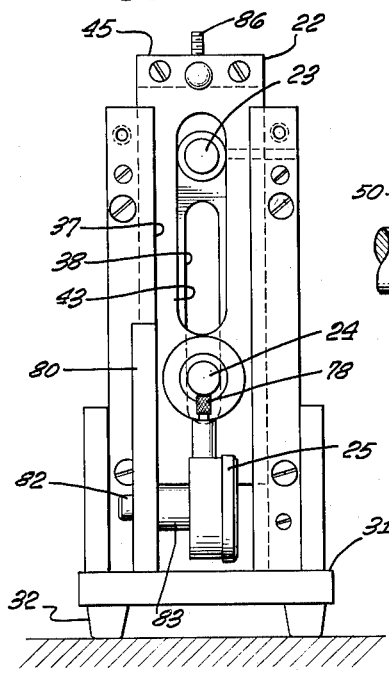
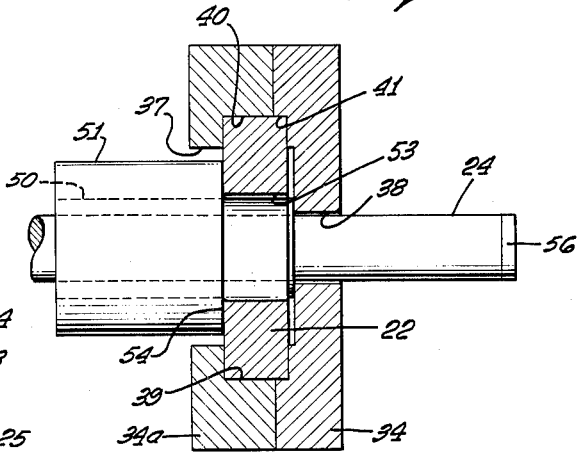
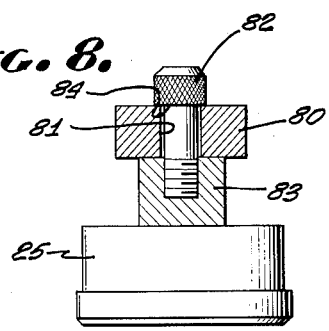
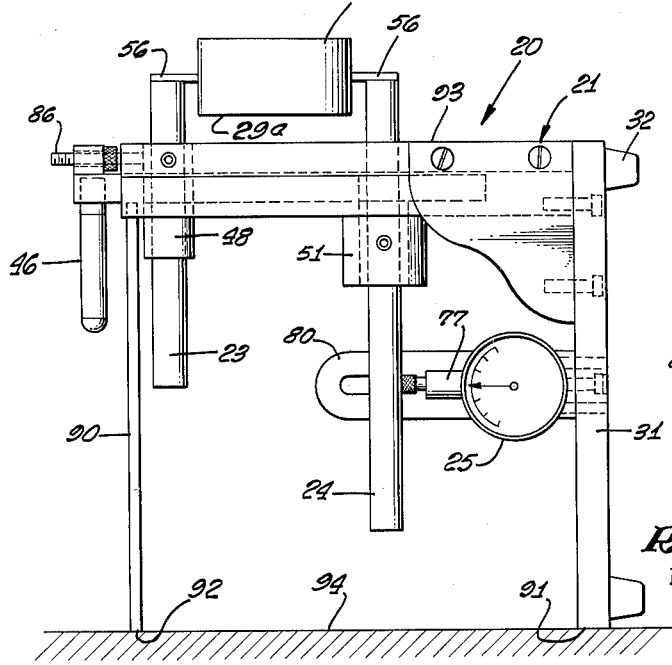
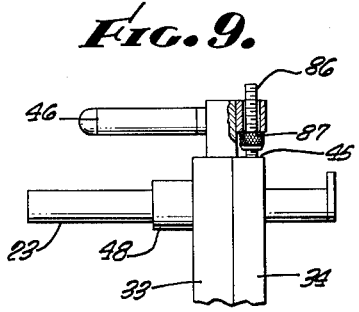
INVENTOR.
RICHARD W. FRICKE
BY
Miketta and Glenny
ATTORNEYS.

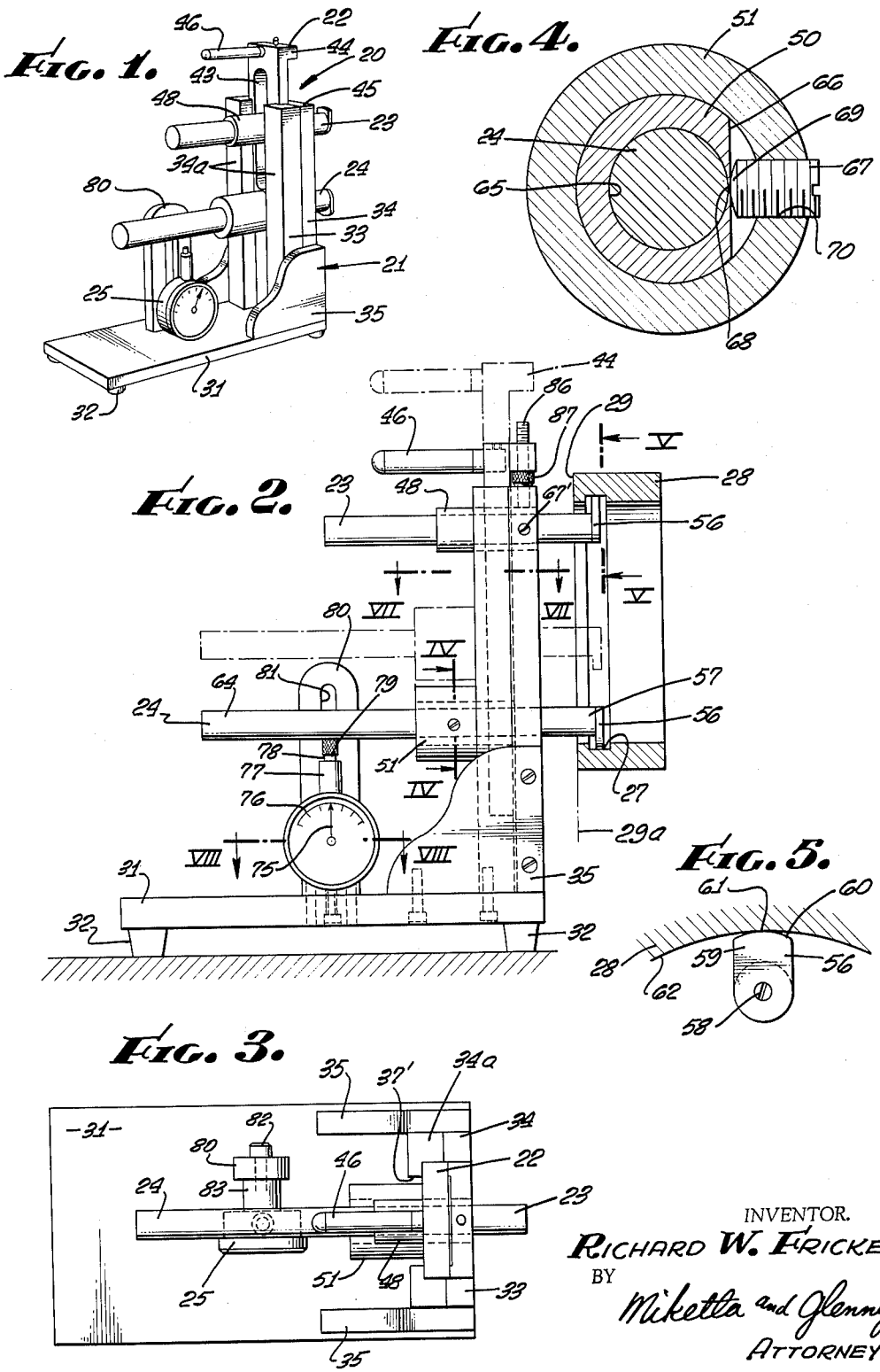

United States Patent Office 3,257,729
Patented June 28, 1966

3,257,729
UNIVERSAL GAUGE DEVICE
Richard W. Fricke, 836 Murietta Drive, Arcadia, Calif.
Filed June 14, 1963, Ser. No. 287,991
9 Claims. (Cl. 33—147)

This invention relates to a gauge device for precise measurement of selected dimensions of objects or articles. The invention particularly relates to a universal gauge device so constructed and arranged that various dimensions of different types of objects or articles may be conveniently and readily precisely measured, determined, and gauged for plus or minus tolerance or differences from a specified dimension.

Prior proposed gauge devices have usually been constructed for specific purposes (as for inspection) and for measuring only one or a few pertinent dimensions of particular articles or objects. Since these prior devices were especially constructed for a particular device, they were not readily adaptable for precise measurement of different articles. Moreover, such especially constructed devices could measure external dimensions only, for example, and another device would be required to measure internal dimensions of an object. Such prior proposed devices often were not sufficiently rigid in their construction to withstand continual use and adjustment, and therefore small deflections in the frame structure of such prior devices often created a structural condition which prevented precise accurate measurement. Prior proposed devices suitable for measuring internal dimensions of an internal O-ring groove, for example, were not readily adaptable for changes in axial location of such groove or for measuring external O-ring grooves or other external dimensions. Moreover, prior locking devices for holding gauge members in fixed predetermined relation often required that such gauge members be other than cylindrical, that is, flatted surfaces were used. Surfaces of the gauge member were often marred by the locking device and such marred surfaces created inaccuracies in the precise measurements desired, that is measurements within 0.001 to 0.0001 inch.

The present invention contemplates a novel structure and arrangement of a gauge device adapted to precisely accurately measure dimensions of various types of articles and objects without major changes or substitutions in arrangement of the gauge device.

The primary object of the present invention, therefore is to disclose and provide a novel universal gauge device capable of precisely measuring dimensions of an object.

An object of the invention is to disclose and provide a gauge device readily adapted to measure internal or external dimensions at varying distances from a reference surface.

Another object of the invention is to disclose and provide a gauge device capable of being employed with a number of different types of articles and adapted to determine dimensional features of such an object at varying longitudinal and lateral distances from a reference surface on the object.

Another object of the invention is to disclose a gauge device so constructed that it may be readily employed and used in more than one position, and thus for certain articles utilize the advantages of gravitational forces acting upon the article.

A further object of the invention is to disclose and provide a universal gauge device which is especially rigid in construction and having certain surfaces machine finished and honed whereby very precise accurate measurements may be made.

A still further object of the invention is to disclose and provide a gauge device embodying a novel locking and retaining means for a movable gauge rod.

A still further object of the invention is to disclose and provide a gauge device which may be readily adapted to measure concentricity of surfaces generated about a common axis.

Various other objects and advantages of the present invention will be readily apparent from the following description of the drawings in which an exemplary embodiment of the invention is shown.

In the drawings:

FIG. 1 is a perspective elevational view of a gauge device embodying this invention.

FIG. 2 is a side elevational view of the device shown in FIG. 1, the phantom lines in FIG. 2 illustrating another position of a movable gauge rod shown in FIG. 1.

FIG. 3 is a top plan view of FIG. 2.

FIG. 4 is a transverse sectional view taken in the plane indicated by line IV—IV of FIG. 2.

FIG. 5 is a fragmentary sectional view taken in the plane indicated by line V—V of FIG. 2.

FIG. 6 is a back or end view taken from the left of FIG. 2.

FIG. 7 is a transverse sectional view taken in the plane indicated by line VII—VII of FIG. 2.

FIG. 8 is a fragmentary sectional view taken in the plane indicated by line VIII—VIII of FIG. 6.

FIG. 9 is a fragmentary side elevational view of the top of the device shown in FIG. 6.

FIG. 10 is a side elevational view of the device shown in FIG. 1 modified for measuring objects in a horizontal plane.

In the drawings, a universal gauge device embodying this invention is generally indicated at 20. Generally speaking, gauge device 20 comprises a main frame means 21, a slide member 22, a pair of gauge rods 23, 24, and a gauge indicator device 25. In this example, the frame means is disposed so that gauge rods 23, 24 are horizontal and, as shown in FIG. 2, may be employed to precisely measure internal dimensions of an object, article, or work piece, in this instance the internal dimensions of an O-ring groove 27 provided in an internal surface of a ring or annular member 28. For purposes of explanation, ring member 28 may include an edge face 29 which is juxtaposed to frame means 21 and which may serve to define a reference surface or plane 29a on ring member 28.

In FIG. 10 an example of a different adaptation of device 20 is illustrated. Device 20 is there disposed with gauge rods 23, 24 in vertical relation so that the reference plane 29a of an object may be disposed in a horizontal plane. Measurement of external dimensions of objects may be facilitated by the adaptation of device 20 as shown in FIG. 10.

In detail, main frame means 21 may comprise a base frame portion or plate 31 of rectangular form and having a plurality of jig feet 32 which may be made of a rubber composition material or of hardened tool steel with precisely finished bottom surfaces in the event the finished surfaces are to be used as a reference surface for the measurement of a dimension of an article. Frame portion 31 may support at one end an upstanding frame portion 33, said upstanding frame portion 33 including a front plate member 34 and upstanding columns 34a. In this example, side gusset plates 35 may join adjacent sections of portions 31 and 33 in order to provide rigid angularly related frame portions. While main frame means 21 has been described as comprising several component parts rigidly connected together, it will be understood that main frame means may be made of a single integral metal casting.

Upstanding frame portion 33 provides a vertically extending or longitudinal opening 37 between columns 34a. Front plates 34 is provided with a similar longitudinally extending opening 38 of reduced width. Longitudinally extending way means 39 are provided by opposed rabbeted edge sections 40 and 41 respectively of the columns 34a and plate 34. The way means 39 serves to guide slide member 22 in its longitudinal movement on way means 39. The surfaces of the slide member 22 which engage the surfaces of rabbeted edges 40, 41 are preferably machine finished surfaces so that a close sliding fit is obtained and precise smooth movement of slide member 22 is provided.

Slide member 22, in this example, comprises a rectangular slide plate of suitable length and having a longitudinally extending center slot 43 opposite to and between openings 37 and 38. The slot 43 may extend for a selected distance, depending upon the amount of travel intended for slide member 22. At its top, slide member 22 may be provided with a forwardly extending projection 44 adapted to overlie the top face 45 of front plate 34. Extending rearwardly from top projection 44, slide member 22 is provided with a handle member 46 which may be readily grasped for raising and lowering slide member 22 on way means 39.

The pair of parallel spaced gauge rods 23 and 24 extend forwardly and rearwardly of frame portion 33 with their axes in alignment with the plane passing vertically through and bisecting the aligned openings 37, 38 and slot 43. Gauge rod 23 may be mounted in fixed relation to the top of frame portion 33 by an elongated bushing or sleeve member 48 carried by frame portion 33, extending through slot 43, and secured to the frame portion in any suitable manner. The axis of gauge rod 23 may be parallel to the bottom surfaces of the feet 32. The sleeve member 48 may be precisely fitted in a bore in front plate 34. Rod 23 is longitudinally and rotably movable in sleeve member 48 as later described.

Gauge rod 24 is mounted at the bottom of slide member 22 and is carried thereby for vertical longitudinal, and rotational movement. The mounting means of gauge rod 24 includes a longitudinally extending sleeve member or bushing 50 received within a through bore of an outer locking collar 51. Sleeve member 50 extends through slide member 22 and may have sliding clearance at 53 with the back face of front plate 34. The locking collar 51 has an end face in abutment at 54 with the back face of the slide member 22. The gauge rod 24 extends through opening 38 in front plate 34 with a loose sliding fit. Gauge rod 24 may thus be moved relative to gauge rod 23 by grasping handle member 46 and raising or lowering slide member 22. During such movement of rod 24 relative to rod 23, the axis of rod 24 is held in parallel relation with the axis of rod 23 by elongated sleeve member 50 and locking collar 51.

A gauge contact element 56 (FIGS. 2 and 5) may be carried on the front end face 57 of each gauge rod 23 and 24. Gauge element 56 may be fixed to the gauge rod by a suitable screw or pin 58 precisely axially threaded in the gauge rod. Gauge element 56 includes a lip 59 extending away from the gauge rod at right angles to the axis of the gauge rod. The projecting lip 59 is provided with an arcuate edge face 60 of selected radius of curvature for precise gauging contact as at 61 with an internal surface 62 of an article to be dimensioned, in this example, ring member 28. The distance from the axis of the gauge rod to the arcuate edge face 60 is precisely determined and selected. Gauge elements 56 may be pointed in opposite directions (FIG. 2) for precise measurement of internal surfaces or may be directed towards each other (FIG. 10) for precise measurement of external surfaces by rotating rods 23, 24 in their respective sleeve members.

Each rod 23 and 24 is longitudinally movable with respect to frame portion 33. Thus, gauge elements 56 may be spaced a selected distance from reference plane 29a of the object being measured.

Means are provided for easily and smoothly locking rods 23 and 24 against such longitudinal movement and rotational movement. Each of rods 23 and 24 is provided with cylindrical accurately finished machine surfaces such as cylindrical surface 64 on rod 24. Each of sleeve members 48, 50 is provided with an internal finished honed surface such as 65 of sleeve 50 (FIG. 4). The length of members 48 and 50 precisely support rods 23, 24 in a rigid manner so that longitudinal axial movement of each rod is permitted without axial misalignment.

With respect to rod 24, locking means therefor comprises a transverse slot 66 cut as by precise milling, in the metal of sleeve 50 and of sufficient width to accommodate the end of a set screw 67. The depth of milled slot 66 is almost the thickness of the wall section of sleeve 50. As a result, a thin section 68 of sleeve metal remains and may be in the order of about 0.010 inch. The internal surface of the thin section 68 which bears against the finished surface of the gauge rod 24 is undisturbed. The external surface of thin section 68 provides a pressure seat for a rounded end 69 of set screw 67. Set screw 67 may be threaded in a threaded bore in collar 51 as at 70.

When set screw 67 is turned to urge screw 67 inwardly, the pressure force applied to thin section 68 will cause some deflection of the thin section and will transmit the pressure force to the internal surface of the sleeve 50 for frictional engagement with the cylindrical surface 64 on rod 24. It will be apparent that such frictional engagement occurs over a relatively substantial bearing area (not at a point) and will vary depending upon the manner in which the thin section is deflected. Thus a smooth locking frictional grip by a normally closely slidable fitted surface portion is provided for the gauge rod. Such pressure gripping does not mar the external surface of the gauge rod, and thus obviates any inaccuracies in measurement due to such surface marring or distortion thereof.

Means for locking gauge rod 23 against longitudinal and rotational movement is similar to that shown and described with respect to gauge rod 24. In this instance, however, a set screw 67' is carried in front plate 34 and extends into a milled slot in sleeve member 48 for pressure contact against a similarly provided thin section of metal 68 as shown in FIG. 4.

Upon loosening set screw 67 to relieve the pressure against the thin section of metal 68, the gauge rod is readily longitudinally moved in its sleeve member and may be readily rotated or turned about its axis. There has been no disturbance of the finished machined and honed mating surfaces between the sleeve members and the gauge rods. Upon applying pressure to the thin metal sections 68 through set screw 67, the gauge rods 23, 24 will be precisely and accurately held against longitudinal or rotational movement.

The precise dimension of the internal diameter of O-ring groove 27 of ring member 28 or the difference between a standard or specified dimension and that of an object to determine allowable tolerances may be quickly and readily measured by the device 20 described above by a gauge indicator device 25 of well-known form and provided with an indicator needle 75 and reference indicia 76 in well-known manner. Indicator device 25 includes an upstanding member 77 guiding a vertically movable indicator pin 78 having a top face 79 for contact with the bottom surface of rod 24.

Indicator device 25 may be vertically adjustably positioned to provide variation in distance between gauge rods 23 and 24 for different size articles, such adjustment means comprising an upstanding slotted post or standard 80 having a vertically extending slot 81 slidably receiving the shank of a stud bolt 82 threaded in a cylindrical boss 83 carried by device 25. The head of stud bolt 82 may frictionally bear as at 84 against the outer surfaces of standard 80 in order to frictionally retain indicator device 25 at a selected position along the slot 81.

Means for adjustably limiting downward movement of gauge rod 24 and for spacing rod 24 a slight distance above the face 79 of indicator pin 78 may comprise an adjustment screw 86 carried at the top of slide member 22 and having an adjustment nut 87 which may be turned so as to cause the screw 86 to advance and to raise or lower slide member 22 relative to frame portion 33. The lower end of adjustment screw 86 may bear against front plate 34. Thus, the adjustment means serves as a positive stop or limit for downward movement of slide member 22 which might cause unwanted striking or abutment of rod 24 against indicator pin 78 with resulting damage to the indicator device.

When it is desired to precisely gauge and measure an article such as ring member 28, and to determine a precise dimension or its plus or minus tolerance from a given dimension of the O-ring groove 27, the following procedure may be employed. A standard or reference dimension is first used to position gauge rod 24 below gauge rod 23 so that indicator pin 78 will just contact the bottom surface of gauge rod 24 and the indicator needle 75 may be set at zero on indicia scale 76. Rods 23, 24 are longitudinally positioned so they may extend into ring number 28 and elements 56 aligned with groove 27 and facing in opposite directions (FIG. 2). The handle 46 may be grasped to raise slide member 22, thus raising rod 24 upwardly and out of contact with gauge pin 78. A ring member to be measured may then be placed over rods 23, 24 and supported on gauge rod 23 with the gauge element contact face 60 in engagement with the internal surface of the O-ring groove 27. The slide member 22 may then be lowered so that gauge rod 24 and its gauge element 56 rests upon the internal surface of the diametrically opposite portion of groove 27. Since the gauge elements 56 have curved surfaces, it will be apparent that the ring member 28 will automatically shift until the contact of bottom gauge element 56 will be precisely diametrically opposite the contact of the top gauge element 56. The contact of the back portion of rod 24 with face 79 of the indicator pin 78 will cause depression of said pin to indicate whether the dimension is exact or has a plus or minus tolerance.

The accuracy of the internal surface of the O-ring groove may be further checked by turning the ring member slowly on its support on the gauge element 56 on rod 23. Any change in movement of the gauge rod 24 because of differences in diameter of the internal surface of the O-ring groove 27 will be detected.

While the above procedure is illustrative of gauging the internal surfaces of an O-ring groove formed in the internal surface of a ring member, it will be readily apparent that if the O-ring groove had been spaced a greater distance from the reference plane 29a, that the gauge rods could readily be unlocked and moved longitudinally forwardly so as to read or gauge an internal dimension spaced a greater distance from the reference plane 29a. Thus, internal dimensions whether of an O-ring groove or simply of a cylindrical bore may be checked for accuracy and tolerance. Since gauge rod 24 may be lifted into close proximity with gauge rod 23, it will be apparent that internal bores of substantial varying size may be readily gauged.

The gauging device shown in FIG. 10 embodies the same construction as that above described, except that a pair of legs 90 of precise dimension are attached to the free or upper end of frame portion 33 so that legs 90 and frame portion 31 provides vertical support means for frame portion 33. If desired, end faces 91 and 92 of frame portion 31 and legs 90 respectively may be finished so that the top or front surface 93 may be precisely horizontal or parallel with the supporting surface 94.

In this example, the gauge rods 23 and 24 may be turned so that the gauge contact elements 56 face towards each other and may be used to gauge external dimensions of an object such as 28. In this position of the device 21, slide member 22 is moved horizontally in order to move gauge rod 24 into and out of gauging contact with an article placed between it and gauge rod 23.

It will be apparent that gauge device 20 may be utilized for measuring internal and external dimensions at various locations on an object or article. The rigid frame and precisely supported longitudinally and rotatably movable gauge rods together with the convenient arrangement of moving one rod toward the other rod provide a versatile, universal gauging device useful for many different types of articles and sturdy enough for use at a production inspection station.

It will be understood that various modifications and changes may be made in the gauge device described above which comes within the spirit of this invention and all such modifications and changes coming within the scope of the appended claims are embraced thereby.

I claim:

1. A universal gauge device comprising:
a main frame means including at least two frame portions disposed at right angles;
one frame portion having a longitudinal opening and a longitudinal way means extending along said opening;
a slide member on said way means and having a longitudinal slot opposite said opening;
a pair of parallel gauge rods, one gauge rod being fixedly positioned at one end of said one frame portion, the other gauge rod being carried by said slide member and movable thereby relative to said one gauge rod;
a gauge element on each rod for contact with an object;
a gauge indicator device on the other frame portion and having an indicator pin for contact with said other gauge rod;
and means mounting said rods for longitudinal positioning of said rods with gauge elements in selected spaced relation to said one frame portion.

2. A device as stated in claim 1 including means for locking said rods in selected longitudinal position.

3. A device as stated in claim 2 wherein said locking means includes a blind bore in said mounting means providing a thin section of metal proximate to said rod, and a set screw operable in the bore for deflecting the metal section against the rod.

4. A device as stated in claim 1 including means on the other frame portion to adjust the indicator device relative to the other rod;
and means on the one frame portion to adjust the one gauge rod relative to the indicator pin on the indicator device.

5. A device as stated in claim 1 wherein said other frame portion has a finished end face distal from the one frame portion;
and leg means attachable to the one frame portion in spaced relation to the other frame portion whereby said one frame portion may be horizontally positionable.

6. A universal gauge device for precise rapid determination of internal or external dimensions of an object comprising:
a pair of parallel spaced gauge rods;
means mounting said gauge rods for movement of one rod relative to the other rod;
a gauge element pivotally carried at one end of each rod;
a gauge indicator device having a gauge pin for contact by said one rod;
means adjustably positioning the other rod;
said mounting means for said gauge rods including means for longitudinal positioning of said rods;

and means locking said rods in selected longitudinal position.

7. A device as stated in claim 6 wherein said locking means includes a blind bore in said longitudinal positioning means and providing a deflectable section of metal, and a set screw operable in said bore for deflecting said metal section and applying pressure force to said rod.

8. In combination with a gauge device including a gauge rod having a cylindrical gauge surface, the provision of:
an outer member having a through bore;
a sleeve member in said bore and fitted on said rod for longitudinal slidable movement of said rod relative thereto;
means providing a thin section of metal on said sleeve adjacent said rod;
and a pressure applying member carried by said outer member and seated against said thin metal section for deflecting said metal section against the cylindrical surface of the rod for holding said rod against longitudinal and rotational movement without marring the surface of said rod.

9. A universal gauge device for precise rapid determinination of internal or external dimensions of an object comprising:
a pair of parallel spaced gauge rods;
means mounting said gauge rods for movement of one rod relative to the other rod;
a gauge element carried at one end of each rod;
a gauge indicator device having a gauge element for contact by said one rod;
means adjustably positioning the other rod;
said mounting means for said gauge rods including means for longitudinal positioning of said rods;
and means locking said rods in selected longitudinal position, said locking means including
an outer member having a through bore,
a sleeve member in said through bore and having a reduced thin section of material at one side thereof and adjacent said rod,
and a pressure applying member carried by said outer member and seated against said thin section of material for deflecting said thin section against the surface of the rod for holding said rod against movement.

References Cited by the Examiner

UNITED STATES PATENTS

| 2,554,469 | 3/1951 | Olson | 33—174 |
| 2,849,797 | 9/1958 | Etchell | 33—147 |
| 2,876,550 | 3/1959 | Tomkow | 33—147 |
| 3,048,429 | 8/1962 | Humby | 287—52.08 |
| 3,114,206 | 12/1963 | Eckert | 33—167 |

ISAAC LISANN, *Primary Examiner.*

SAMUEL S. MATTHEWS, *Examiner.*